Patented Dec. 22, 1936

2,064,945

UNITED STATES PATENT OFFICE 2,064,945

PYRIDINE DERIVATIVES AND PROCESS OF MAKING THE SAME

Joachim Reitmann, Wuppertal-Elberfeld, Germany, assignor to Winthrop Chemical Company, Inc., New York, N. Y., a corporation of New York No Drawing. Application December 16, 1931, Serial No. 581,510. In Germany December 20, 1930

9 Claims. (Cl. 260—42)

This invention relates to 3.5-diiodo-4-pyridone, being useful as intermediate product for the manufacture of valuable contrast agents in X-ray photography. It further relates to a process of preparing 3.5-diiodo-4-pyridone and its derivatives.

It is known that compounds containing iodine have in some cases proved to be suitable for use as contrast agents, which are of importance in the X-ray photography of organs, particularly also of the urinary passages.

Efforts are being made by raising the iodine concentration to obtain a deepening of the X-ray shadow. With this object in view 2-pyridones of high iodine content have already been produced. Such compounds, however, do not display any advantages when applied as X-ray contrast agents compared with the mono-iodine substituted 2-pyridones, since the introduction of a second iodine atom considerably decreases the solubility with the result that intravaneous administration has been found to be impossible.

In accordance with the present invention by iodizing 4-pyridone or its substitution products, the hitherto unknown 3.5-diiodo-4-pyridone or its substitution products are obtained, which, when containing groups conferring solubility attached to the nitrogen, display a considerably greater solubility in water than the corresponding 2-pyridones and in consequence can be used directly in the production of X-ray photographs, in particular of the urinary passages. They are moreover distinguished by a very high halogen content and low toxicity.

The process according to the present invention is performed by reacting upon the aqueous mineral acid solution of 4-pyridone or a substitution product or a mineral acid salt thereof not being substituted in the 3- and 5-position, with at least two equivalents of an iodizing agent of the group consisting of iodine chloride and of a mixture of alkali metal-iodide and -iodate. When using iodine chloride as iodizing agent the reaction is preferably performed in an aqueous hydrochloric acid solution but also other mineral acids, for instance, sulfuric acid may be employed. From the reaction mixture the 3.5-diiodo-4-pyridone may be separated by the addition of caustic alkali. The mixture of alkali metal-iodide and -iodate used as iodizing agent is preferably used in the proportion of 4/3 mols of the iodide and 2/3 mols of the iodate. In this case at least two equivalents of a strong mineral acid calculated on one mol. of the 4-pyridone must be present in the reaction mixture.

When performing the new process advantageously one starts with pyridine, which is first transformed by the action of thionylchloride into a condensation product of the probable formula:

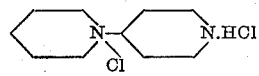

which latter product is converted into 4-pyridone by boiling with water during a prolonged time. The aqueous solution of 4-pyridone obtained after filtration may then be iodized directly according to the above directions, or may be precipitated by nitric acid in form of its nitrate and the latter iodized as above indicated.

As substitution products of the 4-pyridone to be subjected to my new process and being not substituted in the 3- and 5-position, are to be considered, for example, N-alkyl, N-alkylamino-alkyl and N-alkyl-carboxylic and -sulfonic acid derivatives of 4-pyridones, furthermore, 4-pyridones which are substituted in the 2-and/or 6-position, for example, 4-pyridone-2.6-dicarboxylic acid (chelidamic acid), 2-methyl-6-hydroxy-4-pyridone, 2-hydroxy-N-phenyl-4-pyridone-6-carboxylic acid and the like.

It may be mentioned that 3.5-diiodo-4-pyridone may likewise be obtained by first iodizing 4-aminopyridines by the above indicated methods and converting the 3.5-diiodo-4-aminopyridines by diazotization into the corresponding 4-pyridones.

The 3.5-diiodo-4-pyridone and its substitution products are white powders. The 3.5-diiodo-4-pyridone itself decomposes when heated and dissolves in aqueous alkaline solutions, but is insoluble in water or the usual organic solvents.

The invention is further illustrated by the following examples without being restricted thereto:

*Example 1.*—50 grams of 4-pyridone are dissolved in 300 ccs. of 20% hydrochloric acid and a solution of 180 grams of iodine chloride in 200 ccs. of 20% hydrochloric acid is added gradually. After 24 hours the solution is rendered strongly alkaline by means of caustic soda solution, the precipitated sodium salt of the 3.5-diiodo-4-pyridone is filtered off and dried. The 3.5-diiodo-4-pyridone itself is obtained by acidifying the sodium salt solution. It has the above mentioned properties.

*Example 2.*—A solution of 47 grams of 4-aminopyridine in 250 ccs. of 20% hydrochloric acid is treated with a solution of 170 grams of iodo-monochloride in 400 ccs. of 20% hydrochloric acid. Without separating the additional compound of chloro iodine and 4-aminopyridine the solution is treated with an excess of caustic soda and heated on the water bath until the red brown coloration has disappeared. After cooling, the solution is extracted with ether, the ether is distilled off and the residue is fractionated.

The fraction, displaying the boiling point of 130–150° C. at a pressure of 2 mm., is dissolved in dilute hydrochloric acid and treated with a solution of saturated sodium acetate until the solution reacts Kongo neutral. Thereby the 3.5-diiodo-4-aminopyridine separates, which, when recrystallized from alcohol has the melting point 134° C.

The 3-iodo-4-aminopyridine has the melting point 100° C. and can be obtained from the acetic acid mother lye by salting out by means of potassium carbonate.

34.6 grams of 3.5-diiodo-4-aminopyridine are dissolved in 50 ccs. of 20% hydrochloric acid and gradually treated with 70 ccs. of a 10% solution of sodium nitrite. After finishing the reaction the mixture is heated on the water-bath for another half hour. The 3.5-diiodo-4-pyridone separating is obtained by suction.

*Example 3.*—120 grams of pyridine are treated with 360 grams of thionylchloride. After two days standing at room temperature, the excess thionylchloride is distilled off in vacuo. The residue is dissolved in 160 ccs. of water, purified with animal charcoal and heated in the autoclave for 8 hours to a temperature of 150° C. or boiled for 48 hours. A solution of 111 grams of potassium iodide and 74.2 grams of potassium iodate in 600 ccs. of water is added to the resulting reaction mixture. After acidifying with 200 ccs. of 20% hydrochloric acid the mixture is heated at 50–60° C. during 4 hours. The separating 3.5-diiodo-4-pyridone is obtained from the mixture by suction, it is washed with with water and may be purified by recrystallization.

*Example 4.*—39 grams of N-methylchelidamic acid are introduced into a solution of 80 grams of iodo-mono-chloride in 50 ccs. of 20% hydrochloric acid and heated in a closed tube for 10 hours at a temperature of 120° C. The solution resulting from the reaction is then rendered alkaline, strongly acidified with hydrochloric acid, decolorized with a solution of bisulfite and the crystalline precipitate thus formed is sucked off after cooling. The precipitate is digested with 200 ccs. of 20% hydrochloric acid, sucked off and recrystallized from water.

When heating to 170–175° C., the new acid separates carbonic acid by forming N-methyl-3.5-diiodo-4-pyridone of the melting point 207° C.

The same acid is obtained when transforming diiodochelidamic acid with dimethylsulfate into the N-methyl-diiodochelidamic acid ester and saponifying the latter to an acid.

*Example 5.*—A solution of 9.6 grams of 2-methyl-6-hydroxy-4-pyridone in 50 ccs. of hydrochloric acid (20%) is mixed while stirring with a solution of 17.1 grams of potassium iodide and 11.4 grams of potassium iodate in 300 ccs. of water while heating to about 50° C. After the reaction has been finished (about 5 hours), the precipitate formed is sucked off, digested with sodium hydroxide solution (30%) on the water-bath and sucked off after cooling. By recrystallization from water the mono-sodium salt of 2-methyl-3.5-diiodo-6-hydroxy-4-pyridone is obtained in beautiful white needles, which do not melt when heated up to 250° C. The 2-methyl-3.5-diiodo-6-hydroxy-4-pyridone itself decomposes when heated at about 180° C. with a dark coloration.

While I have described my invention in great detail and with respect to preferred embodiments thereof, I do not desire to limit myself to such details or embodiments, since many modifications and changes may be made and the invention embodied in widely different forms without departing from the spirit or scope of the invention in its broadest aspects. Hence I desire to cover all modifications and forms within the scope or language of any one or more of the appended claims.

I claim:—

1. The process which comprises reacting upon pyridine with thionylchloride during a prolonged time, distilling off the excess thionylchloride, boiling the residue with water during several hours at a temperature of about 100–180° C., then filtering the mixture and iodizing the 4-pyridone formed and contained in the filtrate by the addition after acidifying of at least two equivalents of an iodizing agent of the group consisting of iodine chloride and a mixture of alkali metal-iodide and -iodate.

2. The process which comprises reacting upon pyridine with thionylchloride during a prolonged time, distilling off the excess thionylchloride, boiling the residue with water during several hours at a temperature of about 100–180° C., then filtering the mixture and iodizing the 4-pyridone formed and contained in the filtrate by the addition after acidifying of at least two equivalents of iodine chloride and alkalizing the mixture by the addition of an excess of an alkali metal compound selected from the group consisting of alkali metal hydroxides and carbonates.

3. The process which comprises reacting upon pyridine with thionylchloride during a prolonged time, distilling off the excess thionylchloride, boiling the residue with water during several hours at a temperature of about 100–180° C., then filtering the mixture and iodizing the 4-pyridone formed and contained in the filtrate by the addition after acidifying of at least two equivalents of hydrochloric acid with a mixture containing about 4/3 mol. of an alkali metal iodide and 2/3 mol. of alkali iodate.

4. The process which comprises reacting upon 120 parts by weight of pyridine with about 360 parts by weight of thionylchloride at room temperature during about two days, distilling off the excess thionylchloride, boiling the residue with an about equal part of water during some days, filtering the reaction mixture, precipitating from the filtrate the 4-pyridone formed as nitrate by the addition of nitric acid and reacting upon one mol. of the 4-pyridone-nitrate in the presence of hydrochloric acid with at least two equivalents of iodine chloride and alkalizing the mixture by the addition of an excess of an alkali metal compound selected from the group consisting of alkali metal hydroxides and carbonates.

5. The process which comprises reacting upon 120 parts by weight of pyridine with about 360 parts by weight of thionylchloride at room temperature during about two days, distilling off the excess thionylchloride, boiling the residue with an about equal part of water during some days, filtering the reaction mixture, precipitating from the filtrate the 4-pyridone formed as nitrate by the addition of nitric acid and reacting upon one mol. of the 4-pyridone-nitrate in the presence of at least two equivalents of hydrochloric acid with a mixture containing about 4/3 mol. of an alkali metal iodide and 2/3 mol. of alkali metal iodate.

6. As a new product, 3.5-di-iodo-4-pyridone having the formula:

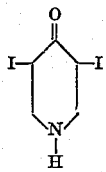

and being a colorless substance insoluble in water and organic solvents, dissolving in dilute caustic alkali solutions and being precipitated from these solutions under the form of its alkali metal salt by caustic alkali in excess.

7. In the process of preparing 3.5-diiodo-4-pyridones, the step which comprises reacting upon an aqueous mineral acid solution of a 4-pyridone of the formula:

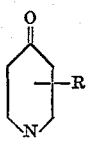

wherein R stands for hydrogen or hydroxyl, alkyl, phenyl, aminoalkyl, carboxylic, alkylaminoalkyl, alkyl sulfonic, and alkyl carboxylic groups and wherein the 3- and 5-positions are unsubstituted, which 4-pyridone is in the form of its mineral acid salt with at least two equivalents of an iodizing agent of the group consisting of iodine chloride and a mixture of alkali metal iodide and -iodate.

8. In the process of preparing 3.5-diiodo-4-pyridones, the step which comprises reacting upon an aqueous solution of a 4-pyridone of the formula:

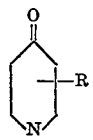

wherein R stands for hydrogen or hydroxyl, alkyl, phenyl, aminoalkyl, carboxylic, alkylaminoalkyl, alkyl sulfonic, and alkyl carboxylic groups and wherein the 3- and 5-positions are unsubstituted, in the presence of hydrochloric acid with at least two equivalents of iodine chloride and alkalizing the mixture by the addition of an excess of an alkali metal compound selected from the group consisting of alkali metal hydroxides and carbonates.

9. In the process of preparing 3.5-diiodo-4-pyridones, the step which comprises reacting upon an aqueous solution containing one mol. of a 4-pyridone of the formula:

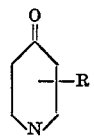

wherein R stands for hydrogen or hydroxyl, alkyl, phenyl, aminoalkyl, carboxylic, alkylaminoalkyl, alkyl sulfonic, and alkyl carboxylic groups and wherein the 3- and 5-positions are unsubstituted, in the form of its mineral acid salt, in the presence of at least two equivalents of hydrochloric acid with a mixture containing about 4/3 mol. of an alkali metal iodide and 2/3 mol. of alkali metal iodate.

JOACHIM REITMANN.